United States Patent
Confalonieri (10) Patent No.: US 8,491,015 B2
(45) Date of Patent: Jul. 23, 2013

(54) QUICK-COUPLING DEVICE FOR PIPELINES AND THE LIKE

(75) Inventor: Orazio Confalonieri, Carate Brianza (IT)

(73) Assignee: C. Matic S.r.L., Carate Brianza (Monza Brianza) (IT)

( * ) Notice: Subject to any disclaimer, the term of this patent is extended or adjusted under 35 U.S.C. 154(b) by 0 days.

(21) Appl. No.: 12/804,158

(22) Filed: Jul. 15, 2010

(65) Prior Publication Data

US 2011/0272935 A1   Nov. 10, 2011

(30) Foreign Application Priority Data

May 4, 2010  (IT) .............................. MI2010A0772

(51) Int. Cl.
*F16L 37/086*  (2006.01)
(52) U.S. Cl.
USPC ............................. 285/317; 285/39; 285/322
(58) Field of Classification Search
USPC ............................ 285/39, 315, 317, 322, 323
See application file for complete search history.

(56) References Cited

U.S. PATENT DOCUMENTS

| | | | | |
|---|---|---|---|---|
| 5,005,877 A * | 4/1991 | Hayman | | 285/315 |
| 5,580,100 A * | 12/1996 | Umezawa et al. | | 285/39 |
| 5,934,709 A * | 8/1999 | Morrison | | 285/39 |
| 6,186,557 B1 * | 2/2001 | Funk | | 285/39 |
| 7,431,346 B2 * | 10/2008 | Frost et al. | | 285/317 |
| 7,832,774 B2 * | 11/2010 | Densel et al. | | 285/308 |
| 2002/0000721 A1 * | 1/2002 | Ohya | | 285/322 |
| 2003/0001386 A1 * | 1/2003 | Cresswell et al. | | 285/305 |

* cited by examiner

*Primary Examiner* — James Hewitt
(74) *Attorney, Agent, or Firm* — R. Ruschena Patent Agent, LLC (57) ABSTRACT

A quick-coupling device for circuits circulating fluids under pressure comprising a socket and a fitting element that can be housed in the socket, the socket including an outer body defining at least part of a first channel and comprising an annular cavity opening on the first channel, a substantially annular constraint element at least partly housed in the annular cavity and movable therein, and including a plurality of constraint sectors made up of circular sectors of the constraint element, moved radially and defining a release position wherein the constraint element is retracted into the groove so as to enable the fitting element moving relative to the socket, and a tightening position at which the constraint element secures the fitting element to the socket, an extractor partly housed in the outer body able to move the constraint element from the tightening position to the release position.

12 Claims, 5 Drawing Sheets

QUICK-COUPLING DEVICE FOR PIPELINES AND THE LIKE

FIELD OF THE INVENTION

The present invention relates to a quick-coupling device for circuits with circulation of fluids under pressure, comprising a fitting element including a second channel, the socket having a central axis, a first channel internal to the socket, and an inlet of the first channel; the first channel being designed to house the fitting element and being brought into fluid communication with the second channel; the socket further comprising an outer body defining at least part of the first channel and comprising an annular cavity opening on the first channel, a substantially annular locking element at least partly housed in the annular cavity and movable within the cavity, and including a plurality of locking sectors consisting of circular sectors of the locking element which can be mutually moved in a radial direction and define a release position at which the locking element is retracted into the annular cavity in such a manner as to enable movement of the fitting element relative to the socket, and a locking position at which the locking element tightly secures the fitting element to the socket. To move the locking element from the locking position to the release position, an extractor, partly housed in the outer body is slided along the central axis relative to the outer body.

DESCRIPTION OF THE PRIOR ART

This quick-coupling device is a device conceived to enable the simple, safe and immediate, connection and disconnection of pipes belonging to lines for circulation of fluids, possibly under pressure, without using any particular tool.

It is known that the realization of hydraulic lines for fluids under pressure, requires the connection of pipes to tanks, to other pipelines or to other elements using connecting means that achieve fluid passage.

This means can have two components, at least one of which is rigidly connected to one of the two pipes usually through welding or forcing operations, or using pipe-clamping bands. These components are usually provided with threads to mutually join them forming the above-mentioned connection.

However, quick couplings are presently more and more frequently preferred to the above described means, the coupling device being enabling two pipes to be connected and disconnected through simple and quick manual operations. These couplings usually have two base elements: a socket and a fitting element, to be partially inserted inside the socket.

In a first example of a coupling, as described by ISO Standard 8434-1:2007(E), the connection between the fitting element and the socket will be done by a forcing operation. In particular, in the socket the presence of three elements is contemplated: a first base body having a thread, a nut suitable for engagement with the thread and a conical element housed between the two components, inside a suitable cavity formed inside the base body. When the nut is secured to the base body, the conical element is forced between the base body and the fitting element, creating the connection.

Another type of coupling device consists of the so-called "quick couplings". In these couplings, the fitting element has a groove or an annular ridge on the outer surface, while the socket has an outer casing having a cylindrical cavity to house the fitting element. This cavity also has a hollow circular area housing a plurality of locking elements that can be radially moved due to the presence of an elastic O-ring.

Initially, the fitting element is inserted inside the socket and the locking elements are pushed by the outer surface of the fitting element inside the hollow circular area thus compressing the elastic ring. When the groove or annular ridge is in corresponding of the locking elements, the elastic ring radially pushes the locking elements which are inserted inside the groove achieving a lock between the fitting element and the socket.

Finally, for a quick release of this lock, a sliding body is provided that, when manually pushed by an operator, disengages the locking elements from the groove or annular ridge enabling the separation of the fitting element from the socket.

The above-described known art has some important drawbacks.

In fact, both types of quick couplings presently known are subject to quick deterioration.

In the first example described above, in fact, the engagement and disengagement operations are rather slow, because it is necessary to use of wrenches and the like.

In addition, locked elements by friction can become inseparable due to deposits or deterioration of the coupling areas and, therefore, it becomes impossible to replace those faulty components. In some cases, even by using suitable tools such as wrenches, for example, can be insufficient to release the locked elements In the second example, a displacement of the locking elements can occur which can bring to the unsteadiness of the quick coupling, leading to the inability of handling high pressures.

A further problem is given by the fact that all known quick couplings are not able to withstand high pressures.

Still another problem is represented by the fact that the two types of actuators are not interchangeable with each other, making impossible to couple the fitting element of one with the socket of the other.

SUMMARY OF THE INVENTION

The purpose of the present invention is to conceive a novel quick-coupling device for pipelines and the like capable of substantially obviating the previously-mentioned drawbacks.

Within the scope of this technical task, it is an important aim of the invention to conceive a reliable and durable quick-coupling device. In particular, it is an important aim of the invention to enable the quick-coupling device to be used easily while avoiding the deterioration of the same on prolonged use.

A further fundamental aim of the invention is to obtain a quick-coupling device withstanding high pressures.

Another important aim of the invention is to provide a device that is at least partly usable with the types of couplings presently known, in particular with the coupling in accordance with ISO Standard 8434-1:2007(E).

The novel quick-coupling device for circuits with circulation of fluids under pressure is comprising a fitting element including a second channel, the socket has a central axis, a first channel internal to the socket, and an inlet of the first channel; the first channel is housing the fitting element and being brought into fluid communication with the second channel; the socket is further comprising an outer body defining at least part of the first channel and comprising an annular cavity opening on the first channel, a substantially annular locking element at least partially housed inside the annular cavity and movable within the cavity, and including a plurality of locking sectors consisting of circular sectors of the locking element which are mutually moved in a radial direction from a release position at which the locking element is retracted into the annular cavity in such a manner as to enable free movement of the fitting element relative to the socket, to a locking position at which the locking element tightly secures the fitting element to the socket, an extractor comprising feet, placed between the locking sectors, designed to maintain a minimum distance between the locking sectors and partly housed in the outer body and movable along the central axis relative to the outer body, designed to move the locking element from the locking position to the release position.

BRIEF DESCRIPTION OF THE DRAWINGS

The features and advantages of the invention are hereinafter clarified by the detailed description of preferred embodiments of the invention, with reference to the accompanying drawings, in which:

FIG. 5b is a top view of the assembly shown in FIG. 5a;

DESCRIPTION OF THE PREFERRED EMBODIMENTS

With reference to the drawings, the quick-coupling device for pipelines and the like in accordance with the invention has been generally identified by reference numeral 1.

It is designed to connect, in a quick and easily separable manner, two pipes 20 or, alternatively, one pipe 20 to a device such as a compressor, a tank or other similar device.

The quick coupling 1 comprises a socket 2 having a central axis 2a and a fitting element 3 to be partly fitted in socket 2 and coupled thereto, preferably being of cylindrical shape. In particular, the fitting element 3 is connected to a pipe 20, while socket 2 is connected to a tank or the like by threading.

The socket 2 and fitting element 3 internally have a first channel 2d and a second channel 3b respectively, that are mutually connected for fluid passage, when the socket 2a and fitting element 3 are fastened to each other. In more detail, the first channel 2d is adapted to receive the fitting element 3 through an inlet 2c. The second channel 3b, on the contrary, comprises an outlet 3e through which the fluid flows from the fitting element 3 to the socket.

Figure 7:
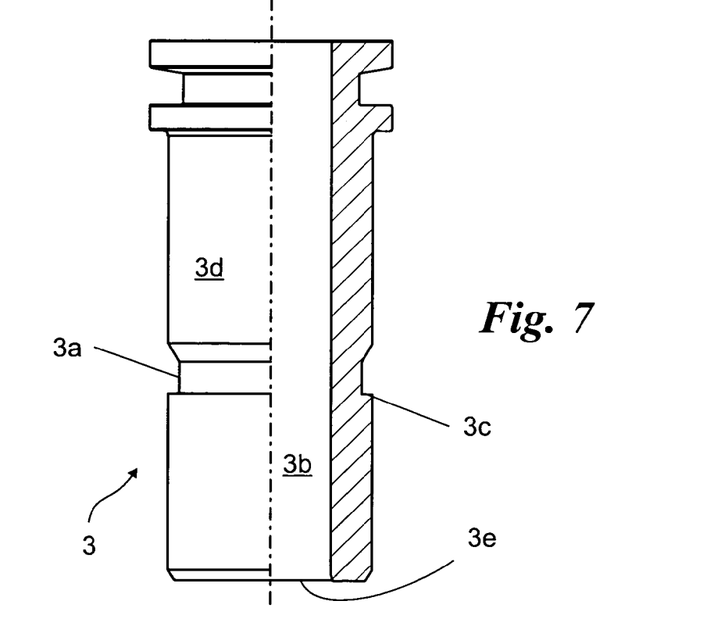
FIG. 7 shows a partial sectional view of a second element of the quick-coupling device in accordance with the invention.

The fitting element 3, shown in FIG. 7, externally has a coupling surface 3d that is substantially cylindrical and with an axis substantially coincident with the central axis 2a, when the fitting element is inserted in the socket 2. Furthermore, this coupling surface 3d is continuously smooth, i.e. devoid of overhangs or other protruding elements except for a single discontinuity represented by a groove 3a that is axially symmetric to, and made to a precise distance from the outlet 3e, as hereinafter better specified. It also has a counter-surface 3c close to the outlet 3e and substantially perpendicular to the central axis 2a.

The socket 2 comprises a locking element 4 that can be moved in a radial direction relative to the central axis 2a and preferably has an almost circular shape, an outer body 5 defining a first portion of channel 2c and designed to contain, at least partially, the locking element 4, and an extractor 6 defining a second portion of channel 2c and adapted to move relative to the outer body 5 in a direction almost parallel to the central axis 2a.

Figure 3:
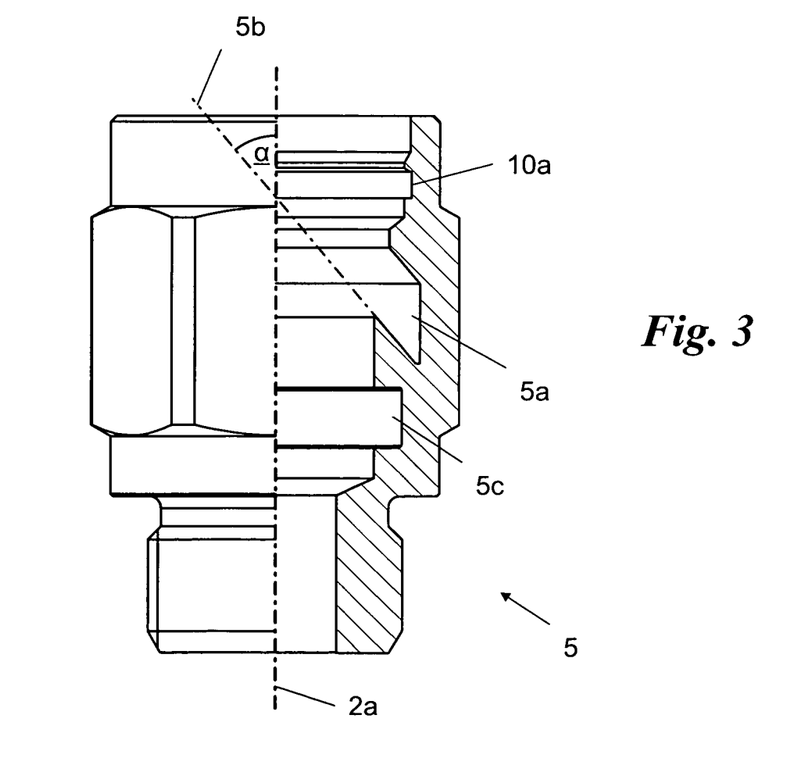
FIG. 3 shows a partial sectional view of a component of the element as shown in FIG. 2.

In greater detail, the outer body 5 has an annular cavity 5a facing cavity 2c and designed to house, at least partially, the locking element 4. This annular cavity 5a extends, as shown in FIG. 3, in an inclined direction 5b relative to the central axis 2a through an angle α in such a manner that the locking element 4, when it moves in a radial direction towards the central axis 2a, simultaneously moves in the direction of the central axis 2a towards the inlet 2c. In particular, angle α is substantially included between 45° and 55° and, preferably, angle α is included between 48° and 52°.

Finally, the outer body 5 has substantially a cylindrical shape and, preferably, with a shaped outer surface so that it can be easily grasped by wrenches or the like. Further, it can be advantageously provided with an outer thread adapted to be connected, by screwing, with a tank or the like.

The locking element 4 also comprises a plurality of locking sectors 7, preferably four, that are at least partly housed inside the annular cavity 5a. The locking sectors 7 are adapted to be mutually and radially moved. Furthermore, due to the particular geometry of the annular cavity 5a, the sectors 7, during their radial displacement, advantageously move along an inclined direction 5b, i.e. they simultaneously move in a radial direction and in a direction parallel to the central axis 2a toward the inlet 2c.

Figure 10:
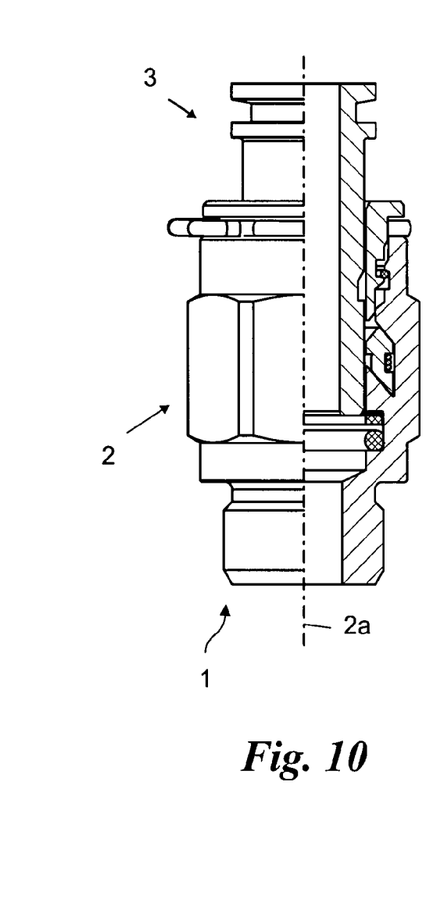
FIG. 10 shows a second possible configuration of the quick-coupling device according to the invention.

Said movement allows two different positions of the locking element 4 to be defined: a release position (FIGS. 10 and 11) at which positioning of the locking sectors 7 enables movement of the fitting element 3 relative to the socket 2; and a locking position at which the locking sectors mutually and tightly connect said two components.

In detail, in the locking position, only a portion of the locking element 4 is inside the cavity 5a, while in the release position, the locking sectors 7 are spaced apart from each other to a greater extend and almost fully laying inside the cavity 5a. In conclusion, when moving from the release position to the locking position, there is a reduction in the distance between the locking sectors 7 and a consequent reduction in the diameter of the locking element 4, respectively.

Figure 2:
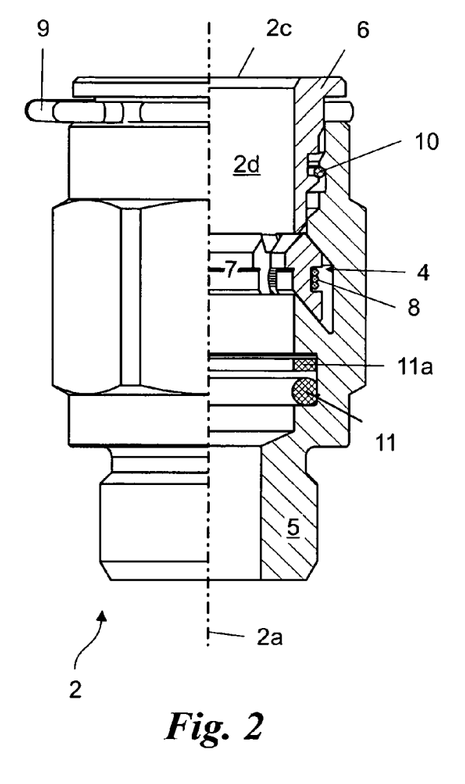
FIG. 2 shows a partial sectional view of an element of the quick coupling device.
Figure 5A:
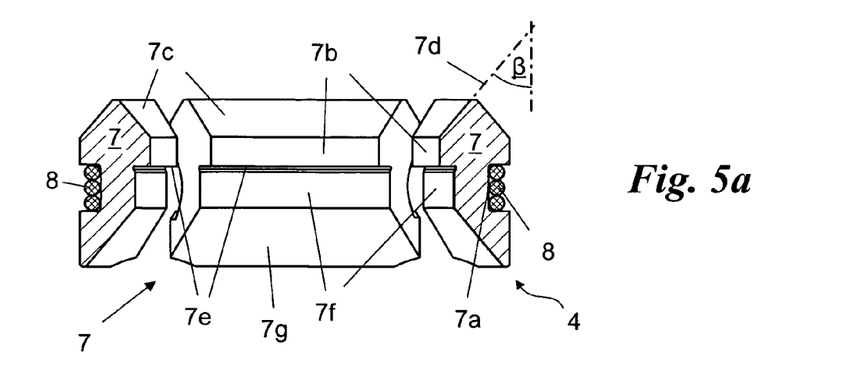
FIG. 5a is a sectional view of an assembly consisting of two other components of the element of FIG. 2.
Figure 5B:
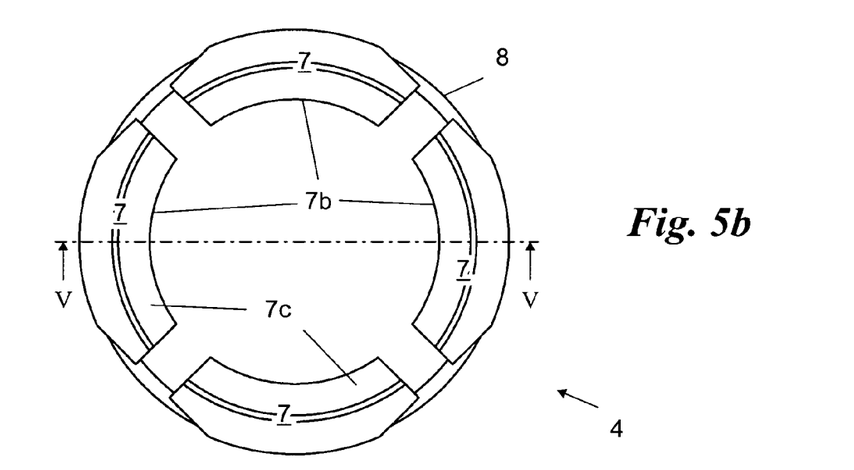
Figure 6:
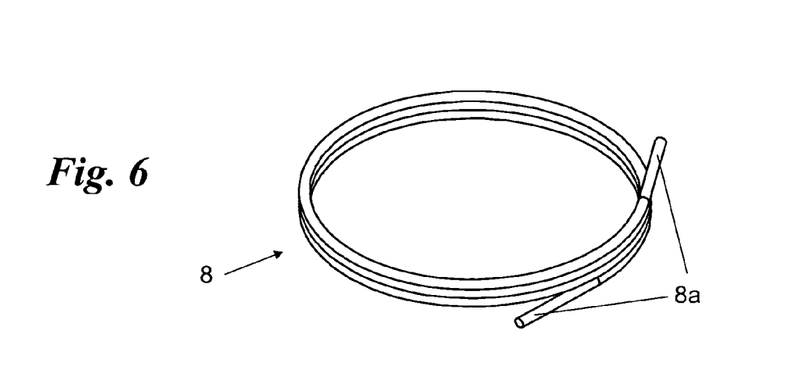
FIG. 6 shows a further component of the element shown in FIG. 2.

In particular, reduction in the distance between the locking sectors 7 is obtained through a spring 8 externally surrounding the locking element 4, as shown in FIGS. 5a and 5b. Said spring is disposed within a housing 7a placed on the outer edge, i.e. the one to a greater distance from the central axis 2a, of each locking sector 7. In addition, the spring 8 is taking up almost the whole height of the housing 7a calculated in a direction parallel to the central axis 2a, so as to ensure a correct positioning of spring 8 and avoid undesired movements of the same. Furthermore, the spring 8 is a metal helical spring preferably made of steel and preferably a spiral spring of which the ends 8a are rectilinear to avoid them being inserted between two locking sectors 7, when the locking element is in a release position, inhibiting returning to the locking position. In particular, the ends 8a are tangent to the circumference defined by spring 8 in a rest position (FIG. 2).

Finally, each of the locking sectors 7 has a ridge 7b on its face close to the central axis 2a, as shown in FIGS. 5a and 5b, which in the locking position enters the cavity 3a locking the fitting element 3 and socket 2 with each other. Upon movement to the release position, the ridge 7b comes out of the cavity 3a enabling mutual motion between the fitting element 3 and the socket 2.

The ridge 7b has an upper conical wall 7c advantageously extending in an oblique direction 7d, being inclined through an angle β relative to the central axis 2a (FIG. 5a) to allow movement of the locking element 4 from the locking position to the release position, when the fitting element 3 is inserted in socket 2. In particular, the fitting element 3, when inserted inside the socket 2, exerts pressure on the upper conical surface 7c causing the sectors 7 to enter the annular cavity 5a and therefore allowing full introduction of the fitting element 3. In particular, angle β is substantially between 45° and 55° and, preferably, it is between 48° and 52°.

In addition, due to the presence of a lower wall 7g, extraction of the fitting element 3 is facilitated. In fact, the extractor 6 is designed to press on said upper conical wall 7c so as to move the locking element 4 from the locking position to the release position, thus clearing the groove 3a and allowing the fitting element 3 to be pulled out.

In addition, the ridge 7b has a lower surface 7e almost perpendicular to the central axis 2a, said surface being adapted to interfere with the counter-surface 3c of the groove 3a. Due to this geometry, during the extraction of the fitting element 3, the lower surface 7e abuts against the counter-surface 3c preventing the fitting element 3 from being pulled out and aligning it with the axis 2a. This advantage is also obtained due to the cavity 5a that, being inclined in the opposite direction relative to the extraction direction of the fitting element 3, prevents an undesired separation of the quick-coupling device 1. Furthermore, the upper surface of the cavity 5a promotes the entry of the ridge 7b into the groove 3a when tightening occurs.

Finally, each sector 7 has, below the lower surface 7e, and preferably also in correspondence of the ridge 7b, a cylindrical surface 7f with an axis substantially coincident with the axis 2a.

The extractor 6 is designed to slide relative to the outer body 5, in a direction almost parallel to the central axis 2a and is advantageously provided, at the lower base opposite to the abutment disc 6b, with teeth 6a (FIG. 4) adapted to be disposed between the locking sectors 7. In particular, when the locking element 4 moves to a locking position, the locking sectors 7 abut against the teeth 6a determining a minimum distance between said locking sectors 7 and, therefore, a minimum size of the locking element 4. Finally, the number of teeth 6a is preferably the same as that of the locking sectors 7, i.e. four.

Figure 1:
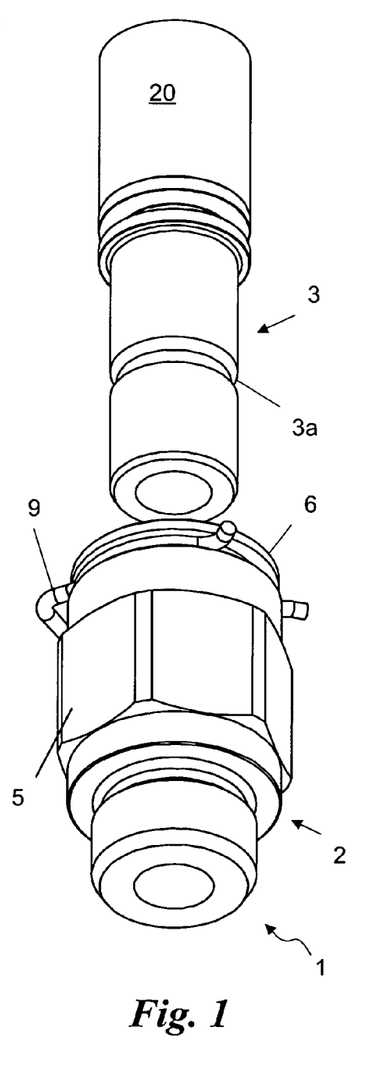
FIG. 1 shows a quick-coupling device according to the invention.

In addition, the lower base of the extractor 6 and the upper base of the locking element 4 are advantageously inclined with respect to the central axis 2a and parallel to each other, so that movements of the extractor 6 gives rise to a displacement of the locking sectors 7 and vice versa. In greater detail, lowering of extractor 6 causes an increase in the sizes of the locking element 4, i.e. passage of same to a release position (FIG. 1), whereas a reduction in the sizes of the locking element 4, i.e. a return to the locked position, causes a raising of extractor 6.

In addition, the extractor 6 is partly housed within the outer body 5 and has an almost cylindrical shape. At the base external to the outer body 5 it has an abutment disc 6b (FIG. 4) designed to push against the upper edge of the external body 5 when the extractor 6 is pressed against said outer body 5.

Socket 2, in addition to the above mentioned components, comprises a stop ring 9 adapted to be inserted, once locking between fitting element 3 and socket 2 has been completed, between the abutment disc 6b and the outer body 5 to prevent movement of extractor 6 relative to said outer body 5. Preferably, the stop ring 9 is an open spring ring, i.e. its circumference is split and more specifically, it is a Seger ring or the like.

In order to prevent the extractor 6 from coming out of the outer body 5, the extractor sliding movement is further limited by a retainer 10 shown in FIG. 2. This retainer 10 is simultaneously housed inside two grooves 10a formed in the extractor 6 and the outer body 5 and always facing each other, at least partly.

The retainer 10 preferably consists of an open spring ring so as to facilitate insertion into the grooves 10a. In particular, during the assembling step, it is enlarged and easily inserted into the grooves 10a of extractor 6. Once it has been positioned, it is allowed to expand so as to adhere to the groove 10a and, finally, extractor 6 is forcibly inserted into the outer body 2.

Socket 2 further comprises an O-ring 11 or other similar means designed to ensure the sealing action of the fluid coupling device 1. The O-ring 11 is advantageously at least partly housed inside a groove 5c (FIG. 3) conveniently formed in the outer body 5 under cavity 5a and, in order to avoid dangerous displacements of the O-ring 11, a sealing component 11a, a ring for example, can be disposed within the groove 5c, so as to lock the O-ring 11 inside the groove 5c.

Figure 8:
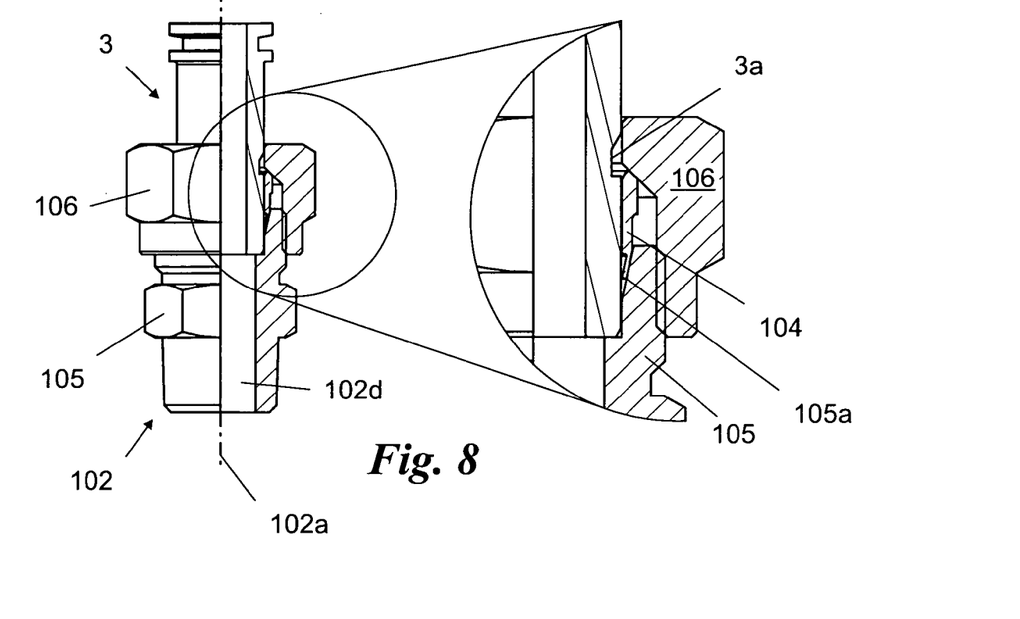
FIG. 8 shows a partial sectional view of a coupling device of known type, in accordance with ISO Standard 8434-1: 2007.
Figure 9:
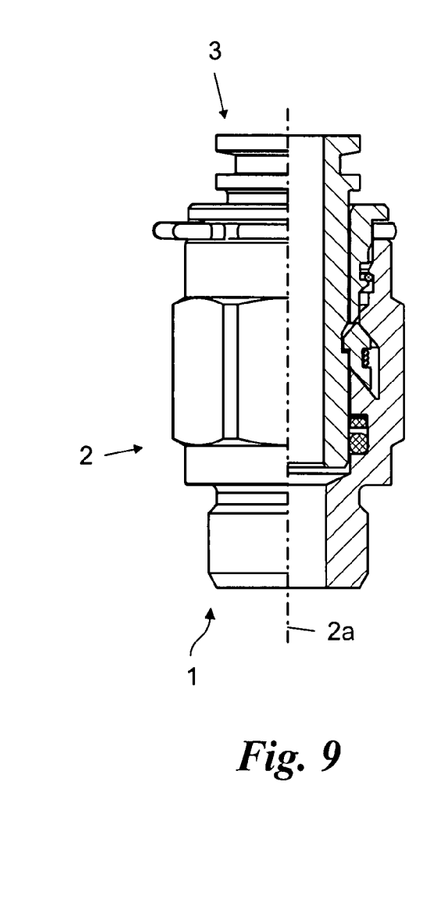
FIG. 9 shows a possible configuration of the quick-coupling device according to the invention.

Shown in FIG. 8 is a second possible configuration of the ogive-shaped coupling device according to ISO Standard 8434-1:2007, which is designed to bring into fluid connection two pipes 20 or one pipe 20 connected to a device, such as a tank.

In this example, the coupling device comprises a fitting element 3 and a socket 102 having a central axis 102a and including a first channel 102d designed to house the fitting element 3.

Socket 102, as shown in FIG. 8, has a locking element 104 to secure the fitting element 3 to the socket 102 by tightening, a base body 105 provided with a cavity 105a adapted to contain, at least partially, the locking element 104, and a closing element 106 designed to be secured to the base body 101, preferably by threading, carrying out said tightening of the locking element 104.

In this preferred embodiment, the closing element 106 is designed to be moved along the central axis 102a and to be rigidly secured to the base body 105 by a threaded coupling, while the locking element 104 has an almost cylindrical shape characterised by a frustoconical end adapted to be inserted inside the cavity 105a. In particular, after the fitting element 3 has been inserted into the socket 102, the closing element 106, being secured to the base body 105, presses the locking element 104 within the cavity 105a, which locking element is therefore forced between the fitting element 3 and socket 102 thus carrying out the tightening of the fitting element 3 to socket 102.

The socket 102 preferably has sizes in accordance with ISO Standard 8434-1:2007 or subsequent modifications to said ISO Standard.

The fitting element 3, shown in FIG. 7, is the one previously described and the given distance of groove 3a is greater than the distance between the cavity 105a and outlet 3e when the fitting element 3 is secured to the socket 102, so that it does not interfere with said tightening action.

Finally, as in the preceding preferred embodiment, groove 3a has a counter-surface 3c, i.e. the surface of groove 3a close to the outlet 3e, that is preferably substantially perpendicular to the central axis 102a.

Operation of the quick-coupling device for pipelines and the like described above as regards structure is the following.

Once pipes 20 have been connected to socket 2 and to the fitting element 3, the fitting element 3 is inserted into socket 2 so that said components are secured to each other.

The fitting element 3 passes through the extractor 6 and abuts against the ridges 7b of the locking sectors 7. Then the fitting element 3 starts pressing on said ridges 7b causing passage from the locking position to the release position of the locking element 4.

In particular, the locking sectors 7 are moved apart from each other, i.e. the locking element increases its diameter and the locking sectors 7 are almost fully housed within the cavity 5a (FIG. 10) thus enabling the fitting element 3 to complete its fitting. In particular, the fitting element 3 continuing its movement comes into contact with the O-ring 11 deforming it and carrying out a fluid-tight connection.

Figure 4:
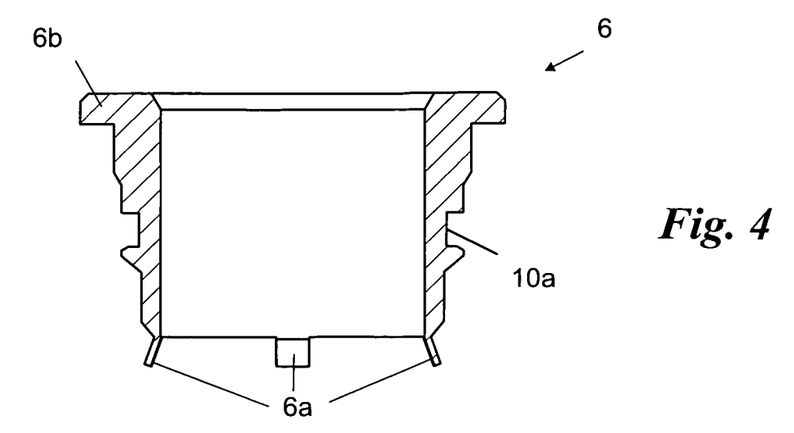
FIG. 4 is a sectional view of a second component of the element as shown in FIG. 2.

When the fitting element 3 is inserted, the groove 3a faces the locking sectors 7 that, being pressed by spring 8, push the ridges 7b into said groove 3a securing the fitting element 3 to the socket 2 and bringing the locking element 4 back to its locking position, as shown in FIG. 4.

In addition, due to their displacement, the locking sectors 7 abut the teeth 6a causing the locking element 4 to have size close to the minimum size, but not strictly coincident with said minimum size. Consequently, the locking element 4 axially compresses the fitting element 3 centering it on the axis 2a, in particular by means of the cylindrical surface 7f.

In addition, before locking, the stop ring 9 is preferably introduced between the abutment disc 6b and the outer body 5 inhibiting any motion of the extractor 6, so as to avoid an undesirable disengagement of the quick-coupling device 1.

When the quick-coupling device 1 needs to be disengaged, i.e. the fitting element 3 is needs to be separated from socket 2, the stop ring 9 is removed from its housing and the extractor is lowered bringing the abutment disc 6b almost in contact with the outer body 5.

This movement of the extractor 6 causes passage of the locking element 4 from the locking position to the release position, i.e. ridges 7b of the locking sectors 7 come out of the groove 3a enabling the fitting element 3 to be pulled out of the socket 2.

Figure 11:
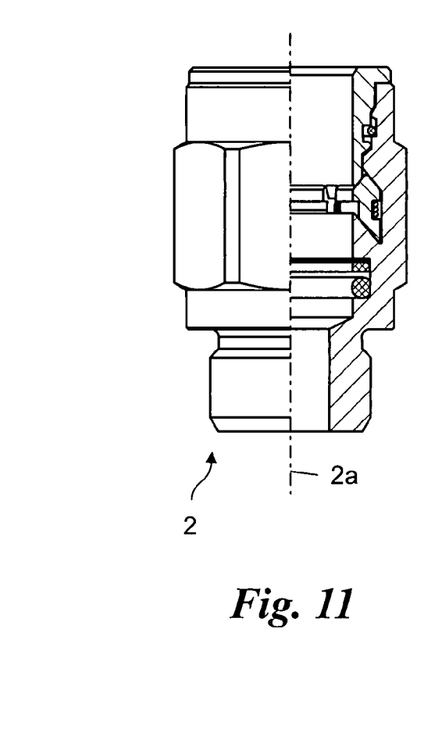
FIG. 11 shows a third possible configuration of the quick-coupling device in accordance with the invention.

Once the fitting element 3 has been pulled out, the locking element 4, due to action of the spring 8, goes back to the locking position with the locking sectors 7 being adjacent to teeth 6a, as shown in FIG. 11.

The invention enables important advantages to be achieved.

A first advantage of the quick-coupling device 1 is represented by the high reliability and duration.

In fact, due to the presence of teeth 6a, the locking sectors 7 going back to the locking position are not submitted to dangerous mutual displacements and their mutual distance is almost unchanged and therefore the tightening strength between fitting element 3 and socket 2 is not diminished.

Another advantage is represented by the quick-coupling device ability that is ensured by the particular geometry of the lower surface 7e and the counter-wall 3c. The quick-coupling device 1 is therefore able to withstand pressures up to 350 bars.

Still another advantage is provided by the metal spring 8 adapted to have a longer duration and greater spring force, also ensured by the number and shape of the sectors 7.

A further important advantage is represented by the possibility of using the fitting element 3 also with ogive-shaped coupling devices of the type ISO Standard 8434-1:2007 presently known. In fact, the particular height where the groove 3a is formed, does not prevent the known quick-coupling devices, as above described, to be connected and fastened.

The invention is susceptible of variations falling within the inventive idea.

All of the details can be replaced by equivalent elements and the materials, shapes and sizes can be of any nature and magnitude.

What I claim is:

1. A socket (2) for a quick-coupling device (1) for circuits carrying fluids under pressure, said quick-coupling device (1) comprising a fitting element (3) including a second channel (3b), said socket (2) has a central axis (2a), a first channel (2d) internal to said socket (2), and an inlet (2c) of said first channel (2d); said first channel (2d) being designed to house securely said fitting element (3) and being brought into fluid communication with said second channel (3b); said socket (2) comprises an outer body (5) defining at least part of said first channel (2d) and comprising an annular cavity (5a) opening on said first channel (2d), a substantially annular locking element (4) at least partially housed inside said annular cavity (5a) and movable within said cavity, said locking element (4) comprises a plurality of locking sectors (7) consisting of sectors of a circular ring which are designed to be mutually moved in a radial direction from a release position at which said locking element (4) is retracted inside said annular cavity (5a) in such a manner as to enable movement of said fitting element (3) relative to said socket (2), to a locking position at which said locking element (4) tightly secures said fitting element (3) to said socket (2), an extractor (6) comprising a plurality of angled teeth (6a) each of them inserted between each pair of locking sectors (7), used to maintain a minimum distance between each pair of locking sectors (7); said extractor (6) is partly housed inside said outer body (5) and movable along said central axis (2a) relative to said outer body (5), to displace said locking element (4) from said locking position to said release position; said socket (2) further comprising a spring (8) which positions said locking element (4) to said release position in the absence of counter-forces.

2. A socket (2) as claimed in claim 1, wherein said spring (8) is a helical metal spring and has rectilinear ends (8a) to prevent unwanted insertion inside the gaps between each pair of locking sectors (7).

3. A socket (2) as claimed in claim 1, wherein each of said locking sectors (7) has a housing (7a) to contain, at least partially, said spring (8).

4. A socket (2) as claimed in claim 1, wherein said annular cavity (5a) extends in an inclined direction (5b) relative to said central axis (2a) in such a manner that, when said locking sectors (7) move in a radial direction towards said central axis (2a), said locking sectors (7) move simultaneously in the direction of said central axis (2a) towards said inlet (2c).

5. A socket (2) as claimed in claim 1, wherein said locking element (4), when said socket (2) houses said fitting element (3), is able to align said fitting element (3) to said central axis (2a).

6. A socket (2) as claimed in claim 1, wherein said extractor (6) has an abutment disc (6b) to abut on said outer body (5), and wherein said socket (2) comprises a stop ring (9) to be inserted between said abutment disc (6b) and said outer body (5) thereby inhibiting the motion of said extractor (6) relative to said outer body (5).

7. A socket (2) as claimed in claim 1, wherein each of the locking sectors (7) comprises a protuberance (7b) to penetrate inside a groove (3a) to lock securely said fitting element (3) into said socket (2), when said locking element (4) is in said locking position.

8. A socket (2) as claimed in claim 7, wherein said protuberance (7b) comprises an upper conical wall (7c) extending in an oblique direction (7d) relative to said central axis (2a) and designed to allow movement of said locking element (4) from said locking position to said release position, when said fitting element (3) is inserted into said socket (2).

9. A socket (2) as claimed in claim 8, wherein said locking element (4) is moved from said locking position to said release position whenever said extractor (6) exerts sufficient pressure on said upper conical wall (7c), causing said protuberances (7b) to be dislodged from said groove (3a) of the fitting element (3).

10. A socket (2) as claimed in claim 7, wherein said protuberances (7b) have a lower surface (7e) that is substantially perpendicular to said central axis (2a).

11. A quick-coupling device (1) for circuits having circulation of fluids under pressure, comprising a socket (2), as claimed in claim 1, and a fitting element (3) and wherein said fitting element (3) has a groove (3a) designed to receive a plurality of protuberances (7b).

12. A quick-coupling device (1) as claimed in claim 11, wherein said groove (3a) has a counter-surface (3c) which is substantially perpendicular to said central axis (2a) and is designed to interfere with said protuberances (7b).

* * * * *